(12) United States Patent
Uzawa et al.

(10) Patent No.: US 9,074,345 B2
(45) Date of Patent: Jul. 7, 2015

(54) SWING DEVICE FOR CONSTRUCTION MACHINE

(75) Inventors: Nobuo Uzawa, Nagareyama (JP);
Mitsugu Ojima, Tsuchiura (JP); Kouji Ishikawa, Kasumigaura (JP); Hidetoshi Satake, Ishioka (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 369 days.

(21) Appl. No.: 13/641,159

(22) PCT Filed: Jun. 17, 2011

(86) PCT No.: PCT/JP2011/063919
§ 371 (c)(1),
(2), (4) Date: Oct. 15, 2012

(87) PCT Pub. No.: WO2012/002175
PCT Pub. Date: Jan. 5, 2012

(65) Prior Publication Data
US 2013/0089400 A1    Apr. 11, 2013

(30) Foreign Application Priority Data
Jun. 30, 2010    (JP) .................. 2010-149470

(51) Int. Cl.
*E02F 9/12* (2006.01)
*E02F 9/20* (2006.01)
*F16H 1/46* (2006.01)

(52) U.S. Cl.
CPC .............. *E02F 9/12* (2013.01); *B60L 2200/40* (2013.01); *E02F 9/123* (2013.01); *E02F 9/126* (2013.01); *E02F 9/202* (2013.01); *F16H 1/46* (2013.01); *E02F 9/20* (2013.01); *E02F 9/2095* (2013.01)

(58) Field of Classification Search
CPC ............. E02F 9/12; E02F 9/2095; E02F 9/20; E02F 9/126; E02F 9/202; E02F 9/123; B60L 2200/40; F16H 1/46
See application file for complete search history.

(56) References Cited

U.S. PATENT DOCUMENTS

| | | | |
|---|---|---|---|
| 8,505,290 B2 * | 8/2013 | Sakai et al. ..................... 60/435 |
| 2003/0098624 A1 * | 5/2003 | Iwasa et al. ..................... 310/112 |
| 2010/0162706 A1 | 7/2010 | Sakai et al. |
| 2011/0001370 A1 | 1/2011 | Yamada et al. |
| 2013/0089400 A1 * | 4/2013 | Uzawa et al. ............... 414/744.1 |
| 2013/0180247 A1 * | 7/2013 | Yamada et al. ................ 60/706 |
| 2014/0274527 A1 * | 9/2014 | Sten et al. ..................... 475/150 |

FOREIGN PATENT DOCUMENTS

| | | |
|---|---|---|
| JP | 2008-169621 A | 7/2008 |
| JP | 2008-297754 A | 12/2008 |
| JP | 2009-209725 A | 9/2009 |

* cited by examiner

*Primary Examiner* — Drew Brown
(74) *Attorney, Agent, or Firm* — Mattingly & Malur, PC (57) ABSTRACT

A reduction gear is mounted on a revolving frame, and an electric motor having an electric motor shaft is disposed on the reduction gear. A hydraulic motor having a shaft is disposed on an upper side of the electric motor. A shaft insertion hole through which an upper end side of the electric motor shaft is inserted is provided in a lid portion of an electric motor casing. A male spline portion provided on the hydraulic motor shaft is spline-coupled to a female spline portion provided on the electric motor shaft. A bearing is provided between the shaft insertion hole and the electric motor shaft, and a pressure tight seal is provided by being located upwardly of the bearing. Hence, spline coupling portions of the female spline portion and the male spline portion are constantly lubricated by making use of drain oil which has leaked from the hydraulic motor.

5 Claims, 6 Drawing Sheets

SWING DEVICE FOR CONSTRUCTION MACHINE

TECHNICAL FIELD

The present invention relates to a swing device for a construction machine which is used in a construction machine such as a hydraulic excavator, a hydraulic crane, or the like and which revolves an upper revolving structure on a lower traveling structure.

BACKGROUND ART

Generally, a hydraulic excavator as a typical example of construction machines is largely constituted by an automotive lower traveling structure, an upper revolving structure which is swingably mounted on the lower traveling structure by means of a revolving ring, and a working mechanism provided on the front side of the upper revolving structure. A swing device is provided between the lower traveling structure and the upper revolving structure, and as this swing device is operated, the upper revolving structure is adapted to revolve on the lower traveling structure.

In this instance, the swing device is generally comprised of a reduction gear which is mounted on the upper revolving structure to decelerate an input rotation and output a decelerated rotation, a revolving motor which is provided on an upper side of the reduction gear to input the rotation of its motor shaft to the reduction gear, and an output shaft for outputting to the revolving ring the rotation of the motor shaft with its speed reduced by the reduction gear.

Here, a so-called hybrid type swing device has been proposed in which a hydraulic motor and an electric motor are arranged to be used in common as the revolving motor. According to this hybrid type swing device, as the output shaft is rotatively driven by both the hydraulic motor and the electric motor, it is possible to reduce exhaust gas from the engine serving as a driving source of the hydraulic motor (Patent Document 1).

PRIOR ART DOCUMENT

Patent Document

Patent Document 1: Japanese Patent Laid-Open No. 2008-297754 A

SUMMARY OF THE INVENTION

In the hybrid type swing device according to the above-described conventional art, a layout is adopted in which the hydraulic motor is disposed on an upper end side of the reduction gear mounted on the upper revolving structure and the electric motor is disposed on an upper end side of the hydraulic motor. Meanwhile, a single motor shaft is arranged to be used in common for the hydraulic motor and the electric motor. Accordingly, the arrangement provided is such that when the single motor shaft is driven by both the hydraulic motor and the electric motor, the rotation of this motor shaft is transmitted to the output shaft after being subjected to speed reduction by the reduction gear.

However, in a case where a hybrid type swing device is configured by combining a hydraulic motor and an electric motor manufactured separately by different manufacturers, it is difficult to integrate the motor shaft of the hydraulic motor and the motor shaft of the electric motor as in the above-described conventional art.

Meanwhile, in the case where the layout is adopted in which, as described above, by using the separately manufactured hydraulic motor and electric motor, the hydraulic motor is disposed on the upper end side of the reduction gear and the electric motor is disposed on the upper end side of the hydraulic motor, the motor shaft for constituting the hydraulic motor needs to have its lower end side coupled to the reduction gear and its upper end side coupled to the motor shaft of the electric motor.

In this instance, coupling portions of the lower end side of the motor shaft of the hydraulic motor and the reduction gear can normally be lubricated by lubricating oil filled in a casing of the reduction gear. In contrast, coupling portions of the upper end side of the motor shaft on the hydraulic motor side and the motor shaft on the electric motor side are normally lubricated by using a lubricant such as grease. For this reason, there is a problem in that in a case where this lubricant has been consumed, the coupling portions of the motor shaft on the hydraulic motor side and the motor shaft on the electric motor side become undesirably worn at an early period.

In view of the above-discussed problems with the conventional art, it is an object of the present invention to provide a swing device for a construction machine which makes it possible to constantly lubricate properly the coupling portions of the hydraulic motor shaft for constituting the hydraulic motor and the electric motor shaft for constituting the electric motor.

(1) To solve the above-described problem, a swing device for a construction machine in accordance with the present invention comprises: a reduction gear which is mounted in a vertically extending manner on an upper revolving structure mounted on a lower traveling structure by means of a revolving ring; an electric motor mounted on an upper side of the reduction gear and having an electric motor shaft which rotates upon supply of electric power thereto; a hydraulic motor mounted on an upper side of the electric motor, a lower end side of a hydraulic motor shaft which rotates upon supply of operating oil thereto being coupled to an upper end side of the electric motor shaft; and an output shaft for outputting to the revolving ring the rotation of the electric motor shaft and the hydraulic motor shaft subjected to speed reduction by the reduction gear, wherein the electric motor has an electric motor casing a lower end side of which is mounted to the reduction gear and an upper end side of which is formed by a lid portion for blocking drain oil from the hydraulic motor, a shaft insertion hole through which the upper end side of the electric motor shaft is inserted is provided in the lid portion of the electric motor casing, a bearing for rotatably supporting the upper end side of the electric motor shaft is provided between the shaft insertion hole and the electric motor shaft, the lower end side of the hydraulic motor shaft extends downwardly toward and into the shaft insertion hole, and is arranged to be coupled to the upper end side of the electric motor shaft, and a seal member for allowing the supply of the drain oil from the hydraulic motor to coupling portions of the electric motor shaft and the hydraulic motor shaft and for preventing the drain oil from entering an interior of the electric motor casing is arranged to be provided between the shaft insertion hole and the electric motor shaft and being located upwardly of the bearing.

By virtue of the above-described arrangement, in a state in which the electric motor shaft is inserted through the shaft insertion hole provided in the lid portion of the electric motor casing, the hydraulic motor is mounted on the upper side of the electric motor, and the lower end side of the hydraulic motor shaft is coupled to the upper end side of the electric motor shaft, whereby it is possible to configure a swing device having a layout in which in a state in which the electric motor shaft and the hydraulic motor shaft are coupled coaxially, the electric motor is disposed on the upper side of the reduction gear, and the hydraulic motor is disposed on the upper side of the electric motor.

In this instance, the coupling portions of the electric motor shaft and the hydraulic motor shaft can be firmly supported by the bearing provided between the shaft insertion hole and the upper end side of the electric motor shaft. As the seal member is provided between the shaft insertion hole and the electric motor shaft at a position located upwardly of the bearing, the coupling portions of the electric motor shaft and the hydraulic motor shaft can be constantly lubricated by making use of the drain oil from the hydraulic motor while preventing this drain oil from entering the interior of the electric motor casing. As a result, it is possible to enhance the durability of the coupling portions of the electric motor shaft and the hydraulic motor shaft, and the rotation of the electric motor shaft and the hydraulic motor shaft can be precisely transmitted to the output shaft through the reduction gear, so that it is possible to enhance the reliability of the swing device.

Moreover, as the gap between the shaft insertion hole of the electric motor casing and the electric motor shaft is sealed by the seal member, it is possible to reliably prevent the ingress of drain oil into the electric motor casing, thereby making it possible to prolong the service life of the electric motor.

(2) In the present invention, a female spline portion constituted by a bottomed hole is provided in the upper end portion of the electric motor shaft, and a male spline portion which is coupled to the female spline portion is provided on the lower end portion of the hydraulic motor shaft, the drain oil from the hydraulic motor being arranged to lubricate the coupling portions of the female spline portion of the electric motor shaft and the male spline portion of the hydraulic motor shaft.

By adopting the above-described arrangement, the coupling portions of the female spline portion provided in the upper end portion of the electric motor shaft and the male spline portion provided on the lower end portion of the hydraulic motor shaft can be constantly lubricated properly by making use of the drain oil from the hydraulic motor. Moreover, as the male spline portion is coupled to the female spline portion constituted by a bottomed hole, foreign objects such as wear debris generated from the coupling portions of the female spline portion and the male spline portion can be captured at the bottom portion of the female spline portion. As a result, since it is possible to prevent foreign objects such as wear debris from entering between the seal member and the electric motor shaft and thereby prolong the service life of the seal member, sealability between the shaft insertion hole of the electric motor casing and the electric motor shaft can be kept satisfactorily over extended periods of time.

(3) According to the present invention, the reduction gear has a reduction gear lower flange portion provided on a lower end side thereof and fastened to the upper revolving structure by means of bolts and has a reduction gear upper flange portion provided on an upper end side thereof, the electric motor has an electric motor lower flange portion provided on a lower end side thereof and fixed to the reduction gear upper flange portion and has an electric motor upper flange portion provided on an upper end side thereof, a hydraulic motor lower flange portion which is fixed to the electric motor upper flange portion is provided on the lower end side of the hydraulic motor, and outside diameter dimensions of the reduction gear upper flange portion, the electric motor lower flange portion, the electric motor upper flange portion, and the hydraulic motor lower flange portion are small as compared to an outside diameter dimension of the reduction gear lower flange portion to which the bolts are attached, and are set to dimensions which make it possible to secure a clearance with a fastening tool which is used when the reduction gear lower flange portion is fastened to the upper revolving structure by means of the bolts.

By adopting the above-described arrangement, when the reduction gear lower flange portion is fastened to the upper revolving structure by means of bolts, the fastening tool for fastening this bolt can be reliably prevented from interfering with the reduction gear upper flange portion, the electric motor lower flange portion, the electric motor upper flange portion, and the hydraulic motor lower flange portion. As a result, it is possible to enhance the operational efficiency at the time when the operation of mounting or dismounting the reduction gear lower flange portion to or from the upper revolving structure is performed by using a fastening tool from above the hydraulic motor with respect to the swing device in which the electric motor is disposed on the upper side of the reduction gear, and the hydraulic motor is disposed on the upper side of this electric motor.

(4) According to the present invention, a power supply box for supplying electric power to the electric motor and various detectors including a temperature detector for detecting the temperature of the electric motor are arranged to be mounted on the electric motor, and the power supply box and the detectors are respectively arranged at positions spaced apart in a circumferential direction from a position of the fastening tool which is used when the reduction gear lower flange portion is fastened to the upper revolving structure by means of the bolts.

With this arrangement, when the operation of mounting or dismounting the reduction gear lower flange portion to or from the upper revolving structure is performed by using a fastening tool from above the hydraulic motor, the power supply box and various detectors mounted on the electric motor do not interfere with the fastening tool, so that it is possible to enhance the operational efficiency in this mounting or dismounting operation.

BRIEF DESCRIPTION OF THE DRAWINGS

FIG. 6 is a plan view similar to FIG. 3 and illustrating the positional relationship between, on the one hand, the fastening tool and, on the other hand, a power supply box, detectors, and the like.

MODE FOR CARRYING OUT THE INVENTION

Hereafter, an embodiment of a swing device for a construction machine in accordance with the present invention will be in detail explained with reference to the accompanying drawings by taking a case in which the swing device for a construction machine is applied to a hydraulic excavator as an example swing device.

Figure 1:
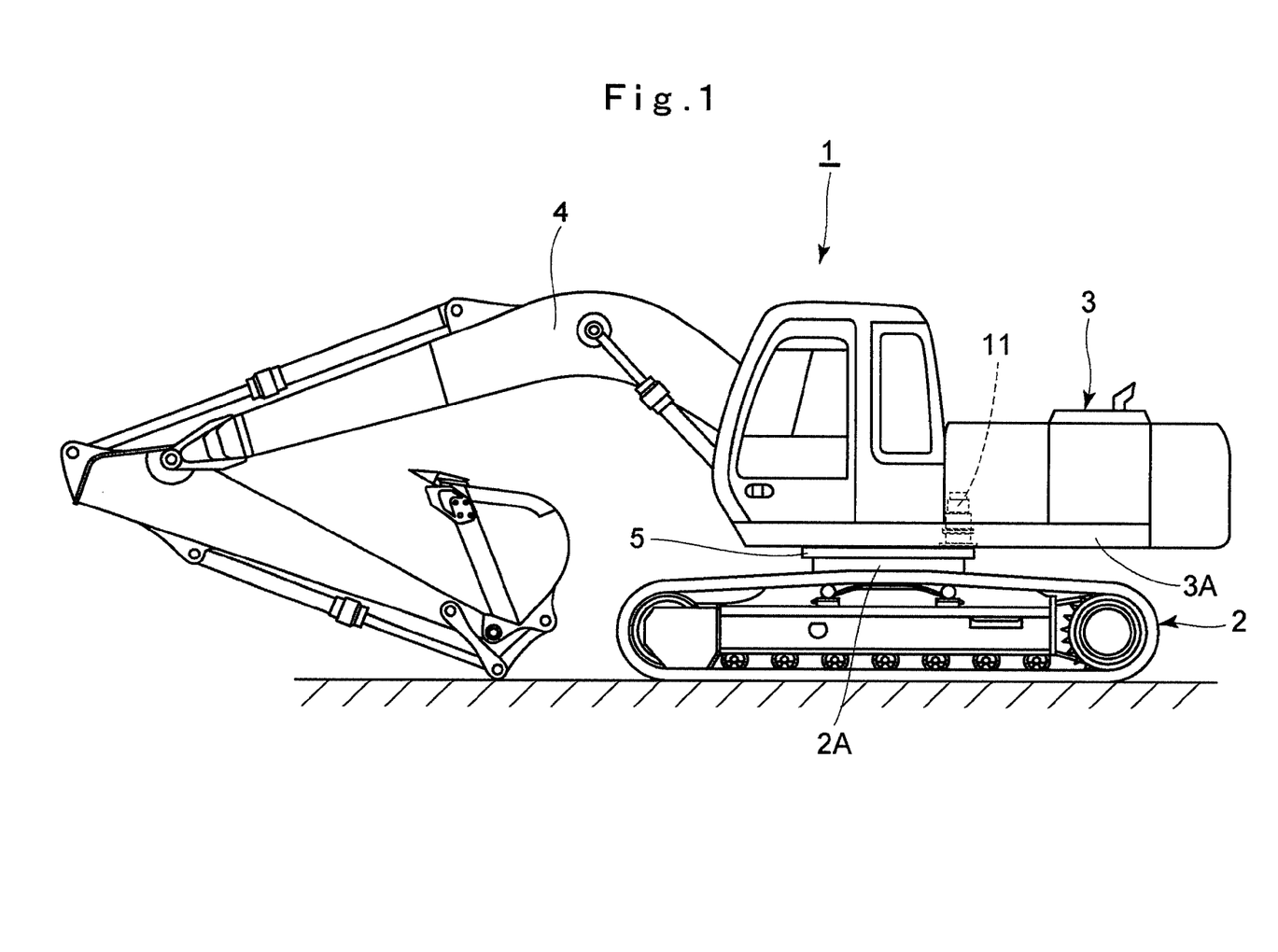
FIG. 1 is a front view illustrating a hydraulic excavator equipped with a swing device in accordance with an embodiment of the present invention.

In the drawings, designated at 1 is a hydraulic excavator which is a typical example of construction machines. The hydraulic excavator 1 is largely constituted by an automotive crawler type lower traveling structure 2 and an upper revolving structure 3 which is swingably mounted on the lower traveling structure 2. A working mechanism 4 is provided liftably on the front side of the upper revolving structure 3. A below-described revolving ring 5 is provided between the lower traveling structure 2 and the upper revolving structure 3, and the upper revolving structure 3 is revolvably supported on the lower traveling structure 2 by means of the revolving ring 5.

Indicated at 5 is the revolving ring which is provided between the lower traveling structure 2 and the upper revolving structure 3. The revolving ring 5 is constituted by an inner race 5A which is fixed on a circle member 2A of the lower traveling structure 2 shown in FIG. 1, an outer race 5B which is fixed on a lower surface side of a revolving frame 3A serving as a base of the upper revolving structure 3, and a multiplicity of steel balls 5C (only one is shown) which are interposed between the inner race 5A and the outer race 5B. Internal teeth 511) are formed on the inner peripheral side of the inner race 5A over the entire circumference. With the hydraulic excavator 1 thus configured, when a below-described swing device 11 is operated and the outer race 5B fixed to the revolving frame 3A rotates around the inner race 5A, the upper revolving structure 3 is arranged to undergo revolving operation on the lower traveling structure 2.

Figure 2:
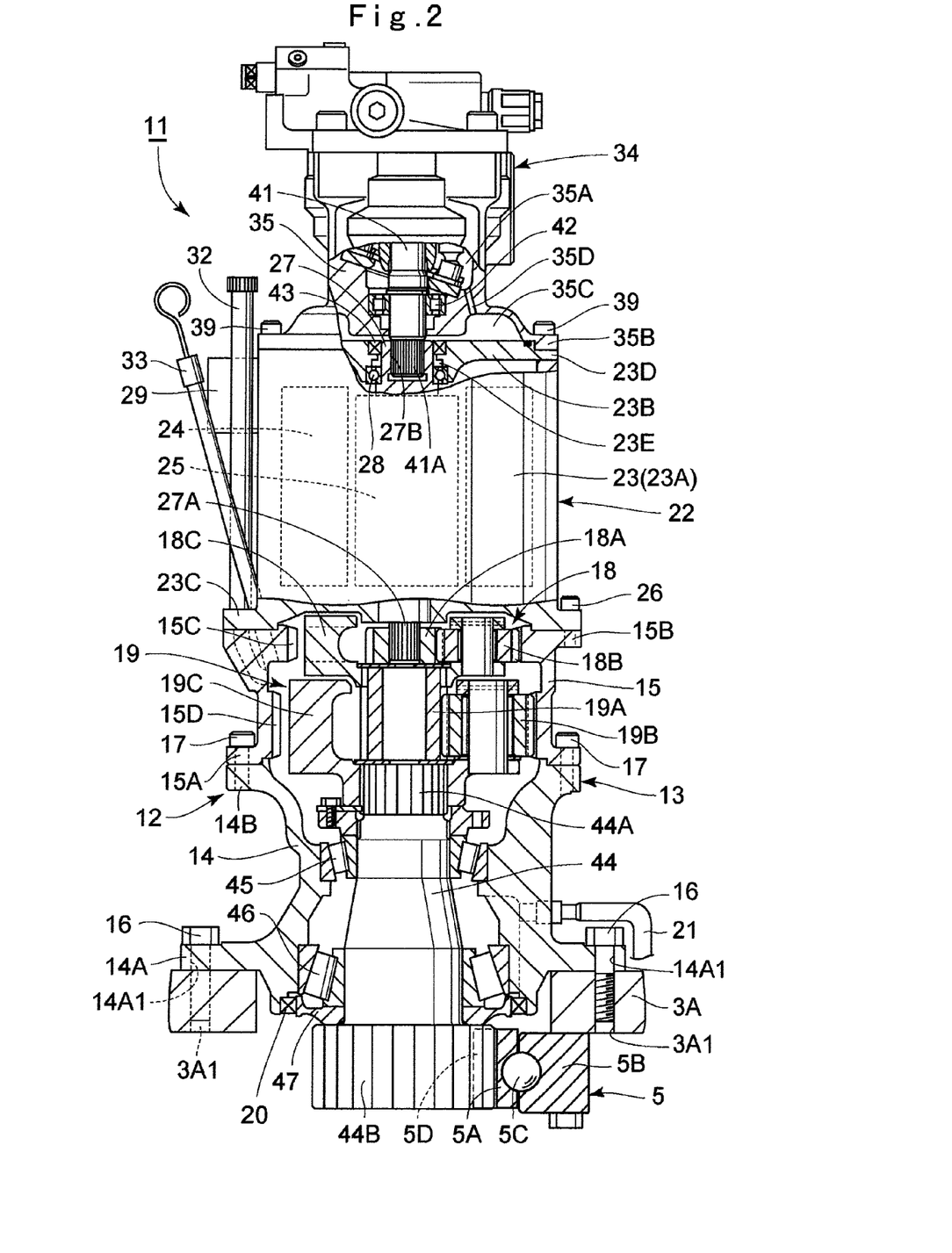
FIG. 2 is a cross-sectional view illustrating the swing device in accordance with the embodiment of the present invention.

Next, the swing device 11 in accordance with this embodiment will be explained. This swing device 11 is for revolving the upper revolving structure 3 supported on the lower traveling structure 2 by means of the revolving ring 5, and is constituted by such as a reduction gear 12, an electric motor 22, a hydraulic motor 34, and an output shaft 44 which will be described hereinafter. This swing device 11 is configured as a so-called hybrid type swing device in which the electric motor 22 and the hydraulic motor 34 cooperate to drive the output shaft 44.

Designated at 12 is the reduction gear which is mounted on the revolving frame 3A of the upper revolving structure 3 in a vertically extending state, and the reduction gear 12 is for decelerating an input rotation inputted from the below-described electric motor 22 and hydraulic motor 34, and outputting a decelerated rotation to the output shaft 44. Here, the reduction gear 12 is constituted by a reduction gear casing 13, a first-stage planetary gear reduction mechanism 18, and a second-stage planetary gear reduction mechanism 19 which will be described hereinafter.

Indicated at 13 is the reduction gear casing which forms an outer shell of the reduction gear 12, and the reduction gear casing 13 is constituted by a cylindrical lower casing 14 which is mounted on an upper surface side of the revolving frame 3A and extends upwardly (in the vertical direction), and a cylindrical upper casing 15 which is mounted on an upper end side of the lower casing 14.

Here, a large-diameter annular reduction gear lower flange portion 14A is provided on a lower end side of the lower casing 14, and a plurality of bolt insertion holes 14A1 are bored in the reduction gear lower flange portion 14A. Accordingly, as bolts 16 which are respectively inserted through the bolt insertion holes 14A1 in the reduction gear lower flange portion 14A are threadedly engaged with bolt holes 3A1 threadedly provided in the revolving frame 3A, the lower casing 14 is fastened to the revolving frame 3A by means of the bolts 16. An annular intermediate flange portion 14B having a smaller diameter than the reduction gear lower flange portion 14A is provided on an upper end side of the lower casing 14. Here, an outside diameter dimension A of the reduction gear lower flange portion 14A is made larger than an outside diameter dimension B of a reduction gear upper flange portion 15B and an electric motor lower flange portion 23C which will be described hereinafter.

Meanwhile, an annular intermediate flange portion 15A is provided on a lower end side of the upper casing 15, and this intermediate flange portion 15A is fastened to the intermediate flange portion 14B of the lower casing 14 by means of bolts 17. The reduction gear upper flange portion 15B having the outside diameter dimension B substantially equal to that of the intermediate flange portion 15A is provided on an upper end side of the upper casing 15, and the arrangement provided is such that the below-described electric motor 22 is fastened to the reduction gear upper flange portion 15B. Two internal gears 15C and 15D are respectively formed on an inner peripheral side of the upper casing 15 over the entire circumference in such a manner as to be spaced apart in the vertical direction. Here, the outside diameter dimension B of the intermediate flange portion 15A is set to a smaller dimension than the outside diameter dimension A of the reduction gear lower flange portion 14A.

Indicated at 18 is the first-stage planetary gear reduction mechanism which is disposed in the upper casing 15 of the reduction gear casing 13. This planetary gear reduction mechanism 18 is constituted by a sun gear 18A which is spline-coupled to a below-described electric motor shaft 27, a plurality of planetary gears 18B (only one is shown) which mesh with the sun gear 18A and the internal gears 15C of the upper casing 15 and revolve around the sun gear 18A while rotating, and a carrier 18C which rotatably supports the planetary gears 18B.

Indicated at 19 is the second-stage (final-stage) planetary gear reduction mechanism which is disposed on the lower side of the planetary gear reduction mechanism 18. This planetary gear reduction mechanism 19 is constituted by a sun gear 19A which is spline-coupled to the carrier 18C of the first-stage planetary gear reduction mechanism 18, a plurality of planetary gears 19B which mesh with the sun gear 19A and the internal gears 15D of the upper casing 15 and revolve around the sun gear 19A while rotating, and a carrier 19C which rotatably supports the planetary gears 19B. The carrier 19C of the planetary gear reduction mechanism 19 is arranged to be spline-coupled to the upper end side of the below-described output shaft 44.

Indicated at 20 is an annular oil seal which is provided on the inner periphery of a lower end portion of the lower casing 14. An outer peripheral surface of the oil seal 20 abuts against the inner peripheral surface of the lower casing 14, and an inner peripheral surface of the oil seal 20 is in slidable contact with an outer peripheral surface of a below-described sleeve 47. This oil seal 20 is for holding lubricating oil for lubricating the respective planetary gear reduction mechanisms 18, 19, and the like within the reduction gear casing 13.

Indicated at 21 is an oil drain pipe mounted on a lower end side of the lower casing 14, and the oil drain pipe 21 is for allowing the lubricating oil stored in the reduction gear casing 13 to be drained to the outside periodically, for example. The arrangement provided is such that after the lubricating oil is drained through the oil drain pipe 21, new lubricating oil is supplied to the interior of the reduction gear casing 13 by using a below-described fuel filling pipe 32.

Next, designated at 22 is the electric motor which is used in this embodiment, and the electric motor 22 is for driving the output shaft 44 in cooperation with the below-described hydraulic motor 34.

Here, the electric motor 22 is constituted by an electric motor casing 23 which is mounted on the upper casing 15 of the reduction gear 12, a stator 24 provided by being fixed inside the electric motor casing 23, a rotor 25 provided rotatably on an inner peripheral side of the stator 24, and the below-described electric motor shaft 27.

In this case, the electric motor casing 23 is constituted by a cylindrical portion 23A whose vertically opposite end sides are open, a disk-shaped lid portion 23B for covering the upper end side of the cylindrical portion 23A, and the electric motor lower flange portion 23C which is provided annularly on the lower end side of the cylindrical portion 23A. The electric motor lower flange portion 23C has the outside diameter dimension B which is substantially equal to that of the reduction gear upper flange portion 15B of the upper casing 15 for making up the reduction gear 12, and is fastened to the reduction gear upper flange portion 15B by means of the bolts 26. The outer peripheral side of the lid portion 23B constitutes an electric motor upper flange portion 23D having an outside diameter dimension C smaller than the outside diameter dimension B of the electric motor lower flange portion 23C, the arrangement provided being such that a below-described hydraulic motor lower flange portion 35B is fixed to the electric motor upper flange portion 23D.

Figure 4:
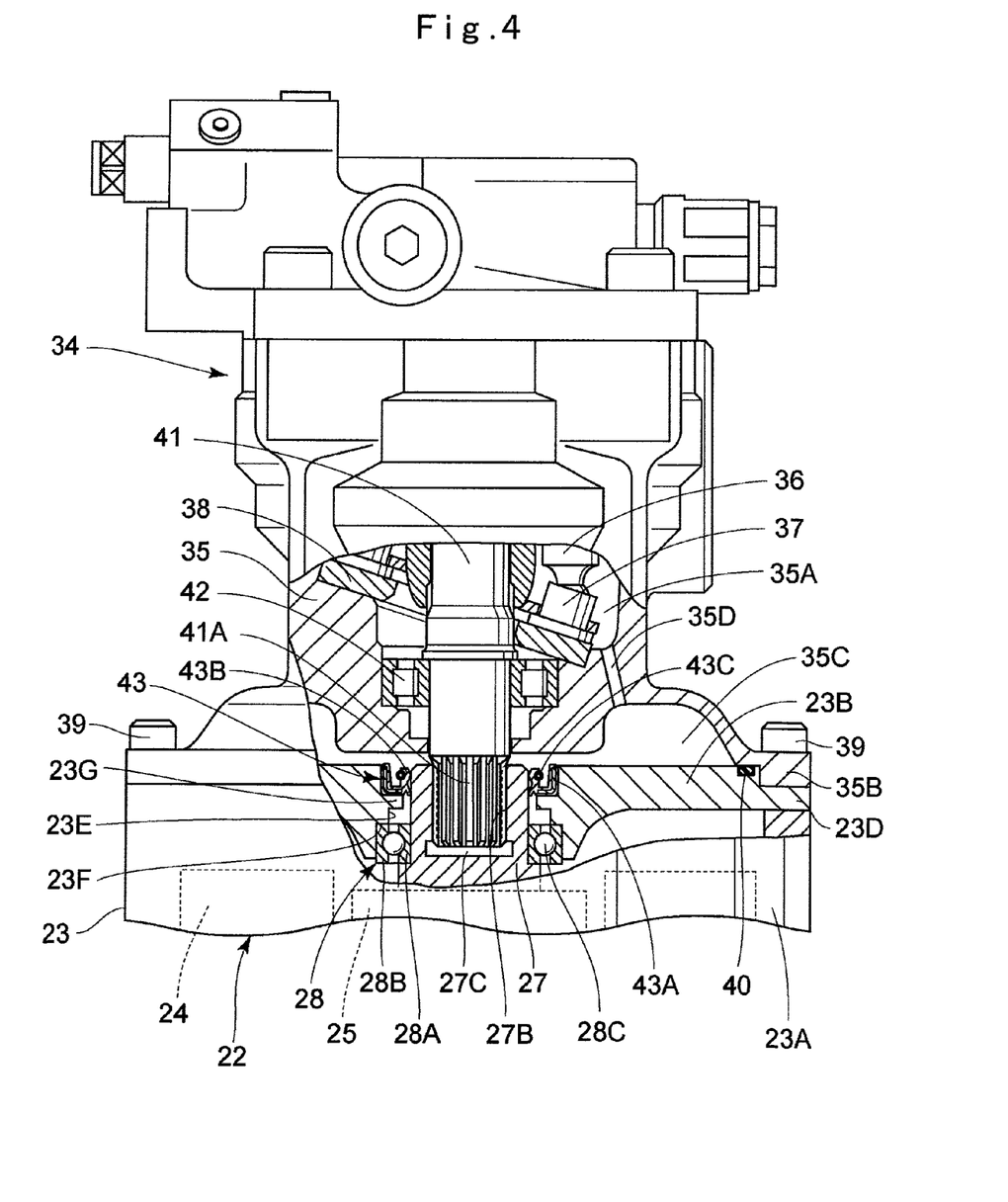
FIG. 4 is an enlarged cross-sectional view of essential portions, illustrating an electric motor shaft, a hydraulic motor shaft, a shaft insertion hole, a bearing, a seal member, and the like shown in FIG. 2.

Indicated at 23E is a shaft insertion hole which is provided in a central portion of the lid portion 23B, and an upper end side of the electric motor shaft 27 is inserted through the shaft insertion hole 23E. Here, a bearing mounting step portion 23F, on which a below-described bearing 28 is mounted, and a seal mounting step portion 23G, on which a below-described pressure tight seal 43 is mounted, are provided on the inner peripheral side of the shaft insertion hole 23E in such a manner as to be spaced apart in the vertical direction.

Indicated at 27 is the electric motor shaft which rotates integrally with the rotor 25. The electric motor shaft 27 with its axially intermediate portion fixed to the rotor 25 is rotatably supported in the electric motor casing 23, and extends vertically through the central portion of the electric motor casing 23. Here, a male spline portion (shaft spline portion) 27A is formed on a lower end side of the electric motor shaft 27 over the entire circumference, and this male spline portion 27A projects downwardly from the lower end side of the electric motor casing 23 toward the interior of the reduction gear casing 13, and is arranged to be spline-coupled to the first-stage sun gear 18A.

The upper end side of the electric motor shaft 27 is inserted through the shaft insertion hole 23E provided in the lid portion 23B of the electric motor casing 23, and is rotatably supported by the below-described bearing 28 mounted on the bearing mounting step portion 23F. It should be noted that the upper end surface of the electric motor shaft 27 is made flush with the upper end surface of the lid portion 23B.

Meanwhile, a female spline portion (hole spline portion) 27B constituted by a bottomed hole is formed in an upper end portion of the electric motor shaft 27, and the female spline portion 27B is arranged to be spline-coupled to a male spline portion 41A of a below-described hydraulic motor shaft 41. In this instance, a recessed hole 27C is formed on a bottom side of the female spline portion 27B, the arrangement provided being such that foreign objects such as wear debris generated from coupling portions of the female spline portion 27B of the electric motor shaft 27 and the male spline portion 41A of the hydraulic motor shaft 41 can be captured within the recessed hole 27C.

Indicated at 28 is the bearing which is provided between the shaft insertion hole 23E of the electric motor casing 23 and the upper end side of the electric motor shaft 27. This bearing 28 is constituted by an inner race 28A fitted to an outer periphery of the electric motor shaft 27, an outer race 28B mounted on the bearing mounting step portion 23F of the shaft bearing insertion hole 23E, and a plurality of steel balls 28C provided between the inner race 28A and the outer race 28B. As the bearing 28 is disposed on an upper end side of the electric motor shaft 27 provided with the female spline portion 27B, the bearing 28 firmly supports the coupling portions of the electric motor shaft 27 and the below-described hydraulic motor shaft 41.

Figure 3:
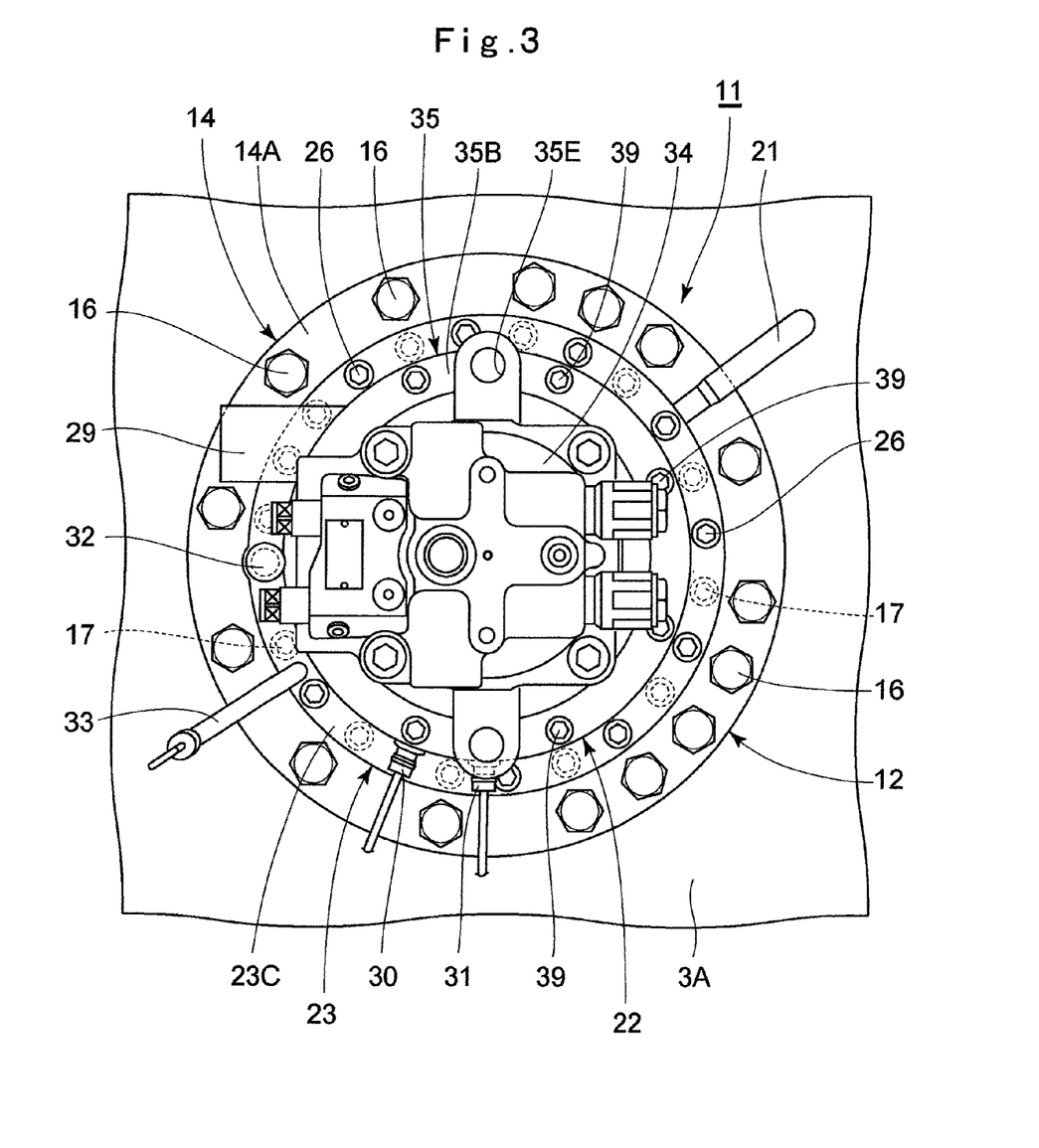
FIG. 3 is a plan view, taken from above, of the swing device.

Indicated at 29 is a power supply box provided on the electric motor 22. As shown in FIGS. 2 and 3, the power supply box 29 is constituted by a rectangular tube body having a rectangular cross section, and projects radially outwardly from an outer peripheral surface of the cylindrical portion 23A of the electric motor casing 23. This power supply box 29 accommodates such as terminals which are connected to the stator 24 of the electric motor 22. The arrangement provided is such that as a power supply cable is connected to these terminals from an external power source (neither is shown), electric power from the external power source is supplied to the electric motor 22.

Figure 6:
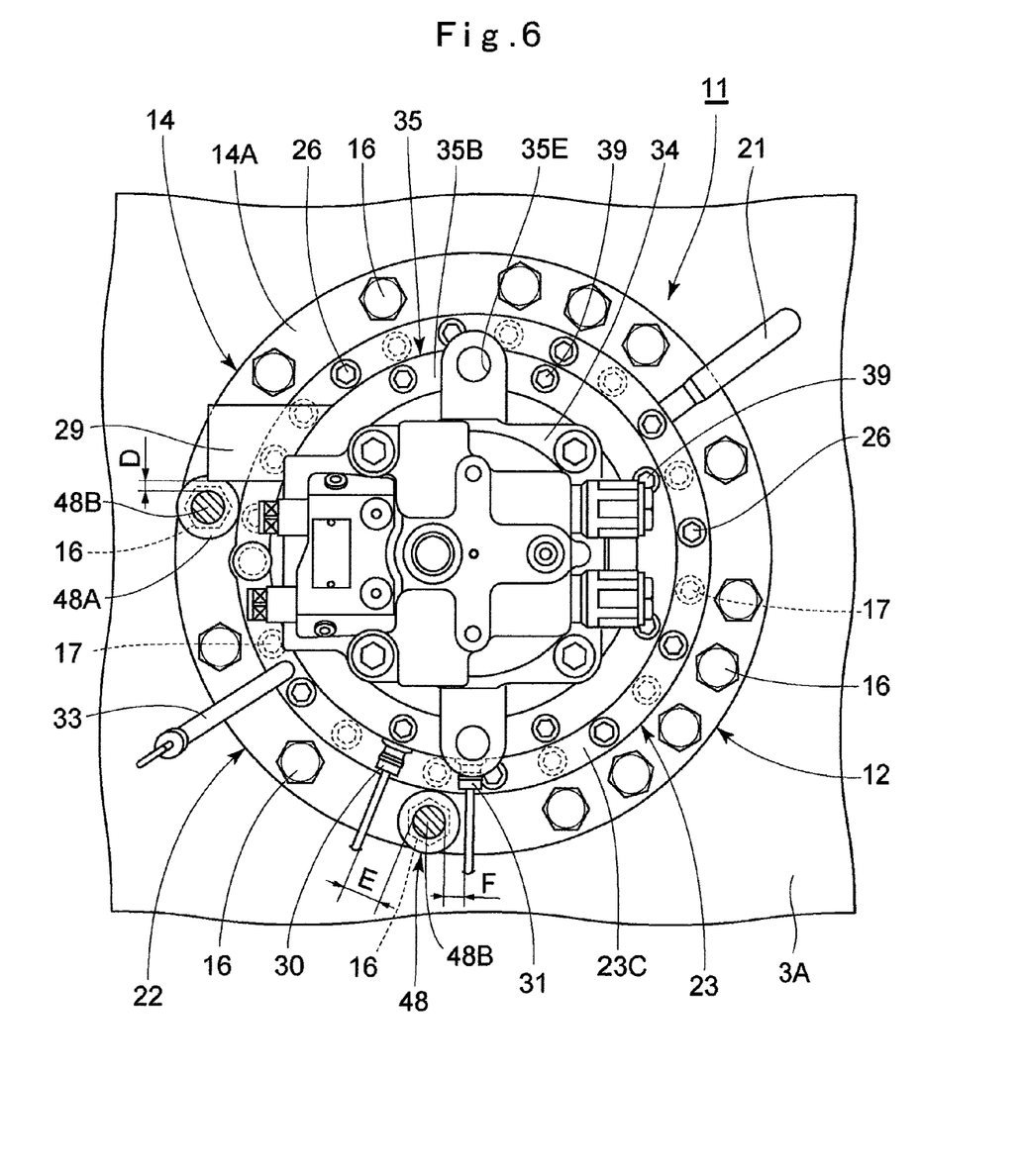

Here, as shown in FIG. 6, the power supply box 29 is arranged at a position spaced apart by a distance D in the circumferential direction from an extended shank portion 48B of a below-described fastening tool 48 when a socket portion 48A of this fastening tool 48 is engaged with the bolt 16, the arrangement being provided so as to be able to prevent interference with the fastening tool 48.

Indicated at 30 is a temperature detector which is provided on the electric motor 22, and indicated at 31 is a rotational speed detector which is similarly provided on the electric motor 22. As shown in FIG. 3, the temperature detector 30 and the rotational speed detector 31 are mounted on the outer peripheral surface of the electric motor casing 23 in a mutually close state. The temperature detector 30 detects the temperature of the electric motor 22 and outputs this detection signal to a controller (not shown) for controlling the operation of the electric motor 22. Meanwhile, the rotational speed detector 31 detects the rotational speed of the electric motor 22 and outputs this detection signal to the controller.

Here, as shown in FIG. 6, the temperature detector 30 is arranged at a position spaced apart by a distance E in the circumferential direction from the extended shank portion 48B of the below-described fastening tool 48 when the below-described socket portion 48A of the fastening tool 48 is engaged with the bolt 16. Meanwhile, the rotational speed detector 31 is arranged at a position spaced apart by a distance F in the circumferential direction from the extended shank portion 48B of the fastening tool 48. Hence, the arrangement provided is such that the temperature detector 30 and the rotational speed detector 31 can be prevented from interfering with the fastening tool 48.

Indicated at 32 is the fuel filling pipe which is provided on the electric motor casing 23, and this fuel filling pipe 32 is fixed to the electric motor lower flange portion 23C and extends in the vertical direction. A lower end side of the fuel filling pipe 32 communicates with the interior of the reduction gear casing 13, and the arrangement provided is such that lubricating oil can be supplied to the interior of the reduction gear casing 13 through the fuel filling pipe 32. Indicated at 33 is an oil level gage provided on the electric motor casing 23, and this oil level gage 33 is for checking the amount of lubricating oil by the level of the lubricating oil filled in the reduction gear casing 13.

Next, designated at 34 is the hydraulic motor of a swash plate type which is disposed on the electric motor 22, and the hydraulic motor 34 is for driving the below-described output shaft 44 in cooperation with the electric motor 22.

Here, the hydraulic motor 34 is largely constituted by a hydraulic motor casing 35 mounted on an upper end side of the electric motor casing 23, a cylinder block (not shown) provided rotatably within a cylinder block accommodating chamber 35A of the hydraulic motor casing 35, a plurality of pistons 36 provided reciprocatably within cylinders of the cylinder block, shoes 37 respectively provided on distal end sides of these pistons 36, a swash plate 38 with which the shoes 37 are brought into sliding contact, and the below-described hydraulic motor shaft 41.

In this instance, the hydraulic motor lower flange portion 35B, which protrudes in a flared shape toward the electric motor 22, is provided on a lower end side of the hydraulic motor casing 35. The outside diameter dimension of this hydraulic motor lower flange portion 35B is set to the outside diameter dimension C substantially equal to that of the electric motor upper flange portion 23D of the electric motor casing 23, and is fastened to the electric motor upper flange portion 23D by means of bolts 39.

Here, an annular seal 40 is provided between the hydraulic motor lower flange portion 35B and the electric motor upper flange portion 23D concentrically with the shaft insertion hole 23E b$_y$ being located on the electric motor casing 23 side. A drain oil chamber 35C is formed between the lid portion 23B of the electric motor casing 23 and the hydraulic motor lower flange portion 35B by being located on the hydraulic motor 34 side. Further, the cylinder block accommodating chamber 35A and the drain oil chamber 35C of the hydraulic motor casing 35 communicate with each other through an oil passage 35D. Meanwhile, as shown in FIG. 3, a drain oil discharge port 35E which is open to the drain oil chamber 35C is provided on a lower end side of the hydraulic motor casing 35, and the drain oil discharge port 35E is connected to an operating oil tank through a drain pipeline (neither is shown).

Accordingly, the arrangement provided is such that drain oil which leaked into the cylinder block accommodating chamber 35A during the operation of the hydraulic motor 34 is allowed to flow into the drain oil chamber 35C through the oil passage 35D, and is then made to return from the drain oil discharge port 35E to the operating oil tank through the drain pipeline.

Indicated at 41 is the hydraulic motor shaft for making up the hydraulic motor 34, and this hydraulic motor shaft 41 has its axially intermediate portion coupled to the cylinder block (not shown). This hydraulic motor shaft 41 is rotatably supported by the hydraulic motor casing 35 by means of a bearing 42 and the like, and extends vertically through a central portion of the hydraulic motor casing 35. The hydraulic motor shaft 41 has its axially intermediate portion coupled to the cylinder block within the cylinder block accommodating chamber 35A and is rotated by the supply and discharge of pressurized oil.

Here, the male spline portion (shaft spline portion) 41A is formed on the lower end side of the hydraulic motor shaft 41 over the entire circumference. This male spline portion 41A extends downwardly from the lower end side of the hydraulic motor casing 35 toward the interior of the shaft insertion hole 23E provided in the lid portion 23B of the electric motor 22. Here, in the case where the electric motor 22 and the hydraulic motor 34 are coupled, the male spline portion 41A of the hydraulic motor shaft 41 is coupled to the female spline portion 27B of the electric motor shaft 27 inserted through the shaft insertion hole 23E of the electric motor casing 23. The electric motor shaft 27 and the hydraulic motor shaft 41 are coaxially coupled by the spline coupling between the female spline portion 27B and the male spline portion 41A, and are thus arranged to be constantly rotated as an integral unit.

Next, designated at 43 is the pressure tight seal serving as a seal member provided between the shaft insertion hole 23E of the electric motor casing 23 and the electric motor shaft 27. This pressure tight seal 43 is disposed upwardly of the bearing 28 and is provided over the entire circumference between the seal mounting step portion 23G of the shaft insertion hole 23E and the outer peripheral surface of the electric motor shaft 27. Here, as shown in FIG. 4, the pressure tight seal 43 is constituted by a metal ring 43A formed annularly with a substantially L-shaped cross section, a lip portion 43B formed of a rubber material or the like and secured to the metal ring 43A by a baking means, and an annular backup ring 43C for pressing the lip portion 43B against the electric motor shaft 27. It should be noted that the pressure tight seal 43 is such as to be capable of withstanding a low pressure of the drain oil leaking from the hydraulic motor 34, e.g., a pressure of 0.1 MPa or higher.

The pressure tight seal 43 liquid-tightly seals between the shaft insertion hole 23E of the electric motor casing 23 and the electric motor shaft 27 against the pressure of the drain oil leaking from the hydraulic motor 34. In consequence, the arrangement provided is such that the drain oil from the hydraulic motor 34 is held within the drain oil chamber 35C formed between the lid portion 23B of the electric motor casing 23 and the hydraulic motor lower flange portion 35B, and is supplied as lubricating oil to the coupling portions (spline coupling portions) of the female spline portion 27B of the electric motor shaft 27 and the male spline portion 41A of the hydraulic motor shaft 41. Further, the arrangement provided is such that as the pressure tight seal 43 seals between the shaft insertion hole 23E of the electric motor casing 23 and the electric motor shaft 27 against the pressure of the drain oil, the drain oil within the drain oil chamber 35C is prevented from entering the interior of the electric motor casing 23 through the shaft insertion hole 23E.

Designated at 44 is the output shaft which is rotatably provided in the reduction gear casing 13. The output shaft 44 is rotatably supported in the lower casing 14 by means of an upper side bearing 45 and a lower side bearing 46, and extends in the vertical direction inside the reduction gear casing 13. Here, a male spline portion 44A is formed on an upper end side of the output shaft 44, and this male spline portion 44A is spline-coupled to the carrier 19C of the second-stage planetary gear reduction mechanism 19.

Meanwhile, a pinion 44B is integrally provided on a lower end side of the output shaft 44. The pinion 44B projects downwardly from a lower end portion of the lower casing 14, and meshes with the internal teeth 5D provided on the inner race 5A of the revolving rings. The disk-shaped sleeve 47 is insertingly fitted to the lower end side of the output shaft 44 by being located between the pinion 44B and the lower side bearing 46, and the sleeve 47 rotates integrally with the output shaft 44. Further, the inner peripheral surface of the oil seal 20 provided on the lower end portion of the lower casing 14 is liquid-tightly brought into sliding contact with the outer peripheral surface of the sleeve 47, and the lubricating oil is held in the reduction gear casing 13 by the oil seal 20.

Accordingly, the rotation of the electric motor 22 and the hydraulic motor 34 is transmitted to the output shaft 44 in a state of being subjected to two-stage speed reduction by the planetary gear reduction mechanisms 18, 19, so that the output shaft 44 rotates at low speed with a large rotational force (torque). In consequence, the pinion 44B of the output shaft 44 revolves along the inner race 5A while meshing with the internal teeth 5D of the revolving ring 5, and this revolving force of the pinion 44B is transmitted to the revolving frame 3A through the reduction gear casing 13. As a result, the upper revolving structure 3 shown in FIG. 1 is able to undergo revolving operation on the lower traveling structure 2.

Figure 5:
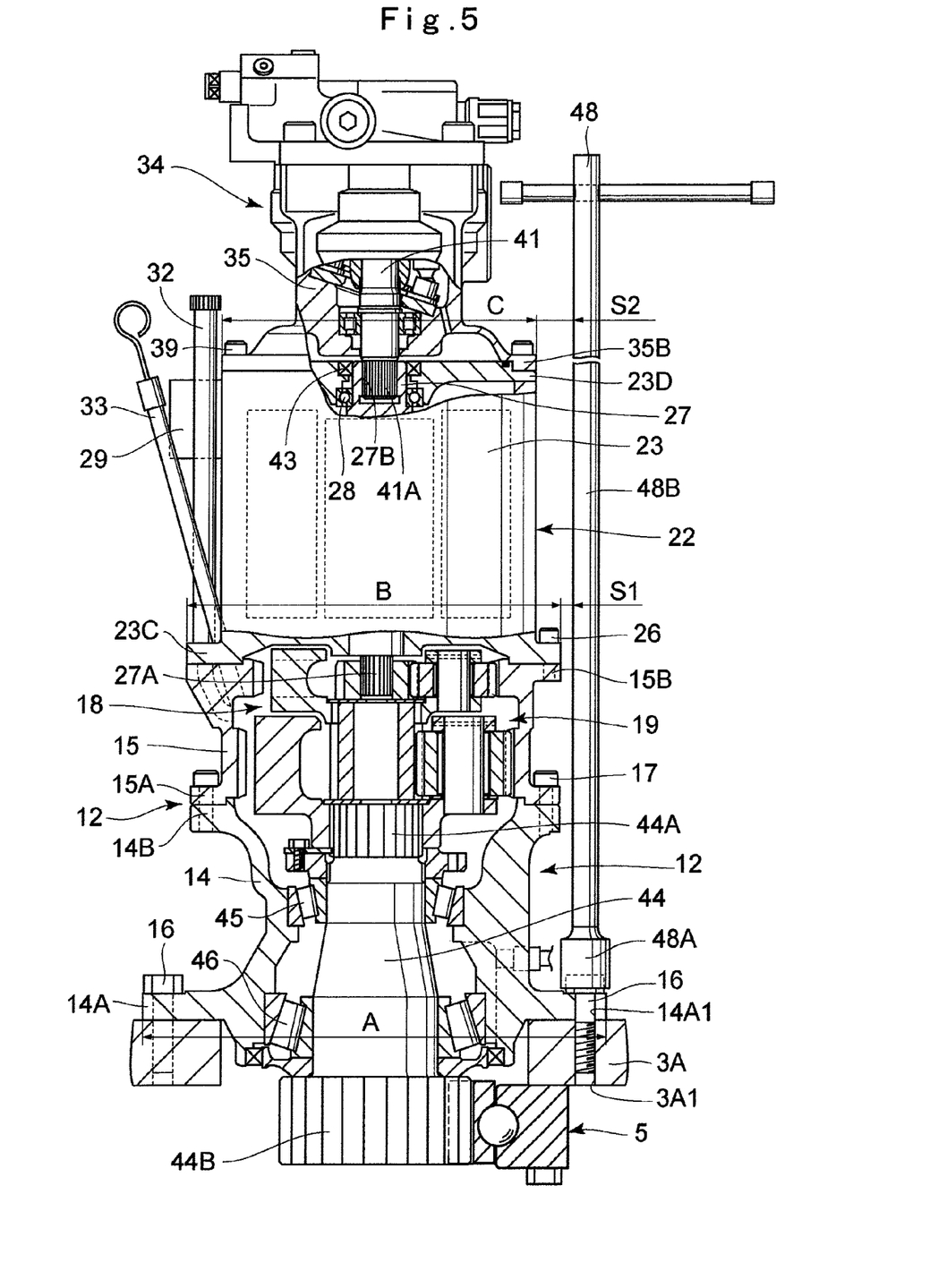
FIG. 5 is a cross-sectional view of the swing device, similar to FIG. 2, and illustrating a state in which a reduction gear is mounted or dismounted by using a fastening tool.

As described above, with regard to the swing device 11, the electric motor 22 is disposed on the reduction gear 12, the hydraulic motor 34 is disposed on the electric motor 22, and the reduction gear lower flange portion 14A of the reduction gear 12 is fastened to the revolving frame 3A by means of the bolts 16. The swing device 11 is thereby mounted on the revolving frame 3A. Accordingly, when the operation of mounting the swing device 11 is performed, as shown in FIG. 5, the operation of fastening the bolts 16 is carried out by using the fastening tool 48 such as a socket wrench having the socket portion 48A and the extended shank portion 48B.

In this instance, the bolt 16 is inserted through the bolt insertion hole 14A1 of the reduction gear lower flange portion 14A and the bolt hole 3A1 of the revolving frame 3A, and the socket portion 48A of the fastening tool 48 is engaged with the head of this bolt 16. In this state, the outside diameter dimension B of the reduction gear upper flange portion 15B and the electric motor lower flange portion 23C of the electric motor 22 is set to a dimension which makes it possible to secure an appropriate clearance S1 between, on the one hand, the outer peripheral surfaces of the reduction gear upper flange portion 15B and the electric motor lower flange portion 23C and, on the other hand, the extended shank portion 48B of the fastening tool 48. The outside diameter dimension C of the electric motor upper flange portion 23D of the electric motor 22 and the hydraulic motor lower flange portion 35B of the hydraulic motor 34 is set to a dimension which makes it possible to secure an appropriate clearance S2 between, on the one hand, the outer peripheral surfaces of the electric motor upper flange portion 23D and the hydraulic motor lower flange portion 35B and, on the other hand, the extended shank portion 48B of the fastening tool 48. Meanwhile, the outside diameter dimension A of the reduction gear lower flange portion 14A is made a largest dimension. Accordingly, the outside diameter dimensions A, B, and C are in the relationship of the following Formula 1.

$$A > B > C \qquad \text{[Formula 1]}$$

Namely, the arrangement provided is such that when the bolt 16 is attached or removed by means of the fastening tool 48 during the operation of mounting or dismounting the reduction gear 12 with respect to the revolving frame 3A, the fastening tool 48 can be reliably prevented from interfering with such as the reduction gear upper flange portion 15B, the electric motor lower flange portion 23C, the electric motor upper flange portion 23D, and the hydraulic motor lower flange portion 35B.

On the other hand, as shown in FIG. 6, the power supply box 29 mounted on the electric motor 22 is arranged at a position spaced apart by the distance D in the circumferential direction from the extended shank portion 48B of the fastening tool 48, the temperature detector 30 is arranged at a position spaced apart by the distance E in the circumferential direction from the extended shank portion 48B of the fastening tool 48, and the rotational speed detector 31 is arranged at a position spaced apart by the distance F in the circumferential direction from the extended shank portion 48B of the fastening tool 48. Hence, the arrangement provided is such that the fastening tool 48 is prevented from interfering with such as the power supply box 29, the temperature detector 30, and the rotational speed detector 31 which are mounted on the electric motor 22, so as to protect the power supply box 29, the temperature detector 30, the rotational speed detector 31, and the like.

In the same way, the fuel filling pipe 32 and the oil level gage 33 which are mounted on the electric motor 22 are also arranged at positions spaced apart in the circumferential direction from the extended shank portion 48B of the fastening tool 48, the arrangement provided being such that the fuel filling pipe 32 and the oil level gage 33 can be prevented from interfering with the fastening tool 48.

The swing device 11 in accordance with this embodiment has the above-described configuration, and as electric power is supplied to the electric motor 22 and operating oil is supplied to the hydraulic motor 34, both the electric motor shaft 27 of the electric motor 22 and the hydraulic motor shaft 41 of the hydraulic motor 34 are simultaneously rotated on the basis of a power distribution which is set by the controller (not shown). In this case, since the electric motor shaft 27 and the hydraulic motor shaft 41 are coupled to each other coaxially, the rotational force is transmitted from the electric motor shaft 27 to the reduction gear 12 in a state in which the rotational force of the electric motor shaft 27 and the rotational force of the hydraulic motor shaft 41 are combined.

The rotation of the electric motor shaft 27 with the rotational force of the hydraulic motor shaft 41 combined therewith is subjected to two-stage speed reduction by the planetary gear reduction mechanisms 18, 19 of the reduction gear 12 and is then transmitted to the output shaft 44, so that the pinion 44B rotates with a large rotational force (torque). The pinion 44B revolves along the inner race 5A while meshing with the internal teeth 5D provided on the inner race 5A of the revolving ring 5, and this revolving force of the pinion 44B is transmitted to the revolving frame 3A through the reduction gear casing 13. As a result, the upper revolving structure 3 undergoes revolving operation on the lower traveling structure 2.

Here, the drain oil which leaked from the hydraulic motor 34 during the operation of the swing device 11 is led from the cylinder block accommodating chamber 35A of the hydraulic motor casing 35 into the drain oil chamber 35C through the oil passage 35D, and is then recirculated from the drain oil discharge port 35E shown in FIG. 3 to the operating oil tank through the drain pipeline (neither is shown).

In this instance, in this embodiment, the arrangement provided is such that the shaft insertion hole 23E, through which the upper end side of the electric motor shaft 27 is inserted, is provided in the lid portion 23B of the electric motor casing 23 defining the drain oil chamber 35C with respect to the hydraulic motor lower flange portion 35B, and the gap between this shaft insertion hole 23E and the electric motor shaft 27 is sealed by the pressure tight seal 43. For this reason, drain oil can be stored within the drain oil chamber 35C, and the drain oil in the drain oil chamber 35C can be supplied to the coupling portions of the female spline portion 27B formed in the upper end portion of the electric motor shaft 27 and the male spline portion 41A formed on the lower end portion of the hydraulic motor shaft 41.

Thus, as the coupling portions of the electric motor shaft 27 and the hydraulic motor shaft 41 are constantly lubricated by making use of the drain oil from the hydraulic motor 34, it is possible to enhance the durability of the female spline portion 27B of the electric motor shaft 27 and the male spline portion 41A of the hydraulic motor shaft 41. Since the rotation of the electric motor shaft 27 and the hydraulic motor shaft 41 can be precisely transmitted to the output shaft 44 through the reduction gear 12, it is possible to enhance the reliability of the swing device 11.

Meanwhile, as the gap between the shaft insertion hole 23E provided in the lid portion 23B of the electric motor casing 23 and the electric motor shaft 27 is sealed by the pressure tight seal 43, it is possible to reliably prevent the ingress of drain oil into the electric motor casing 23, thereby making it possible to prolong the service life of the electric motor 22.

Furthermore, as the female spline portion 27B constituted by a bottomed hole is provided in the upper end portion of the electric motor shaft 27, it is possible to form the recessed hole 27C on the bottom side of the female spline portion 27B. In consequence, even if foreign objects such as wear debris are generated from the coupling portions of the female spline portion 27B of the electric motor shaft 27 and the male spline portion 41A of the hydraulic motor shaft 41, these foreign objects such as wear debris can be captured within the recessed hole 27C. For this reason, it is possible to prevent the foreign objects such as wear debris from entering between the lip portion 43B of the pressure tight seal 43 and the outer peripheral surface of the electric motor shaft 27, making it possible to prolong the service life of the pressure tight seal 43. As a result, sealability between the shaft insertion hole 23E of the electric motor casing 23 and the electric motor shaft 27 can be kept satisfactorily over extended periods of time, thereby making it possible to prolong the service life of the swing device 11 including the electric motor 22.

As such, according to this embodiment, the arrangement provided is such that in the state in which the electric motor 22 is mounted on the upper side of the reduction gear 12, and the upper end side of the electric motor shaft 27 and the lower end side of the hydraulic motor shaft 41 are coaxially coupled, the hydraulic motor 34 is mounted on the upper side of the electric motor 22. Therefore, it is possible to form the swing device 11 having the layout in which the electric motor 22 is disposed on the upper side of the reduction gear 12, and the hydraulic motor 34 is disposed on the upper side of the electric motor 22.

In consequence, it is unnecessary to form the swing device by using the electric motor and the hydraulic motor for which a single motor shaft is used in common as in the conventional art, and the swing device 11 can be formed by appropriately combining the electric motor 22 having the electric motor shaft 27 and the hydraulic motor 34 having the hydraulic motor shaft 41 formed separately from the electric motor shaft 27. Hence, it is possible to enhance the degree of freedom in designing the swing device 11.

As the hydraulic motor 34 is disposed on the upper side of the electric motor 22, in regard to this hydraulic motor 34, by changing, for instance, the lengthwise dimension of the hydraulic motor shaft 41, the male spline portion 41A provided on the hydraulic motor shaft 41 can be coupled to the female spline portion 27B provided in the electric motor shaft 27. As a result, the swing device 11 in which the hydraulic motor 34 is mounted on the upper side of the electric motor 22 can be formed only by a simple design change with respect to an existing hydraulic motor, so that it is possible to attain simplification of the configuration of the swing device 11 and reduction in the manufacturing cost.

Moreover, as the hydraulic motor 34 is disposed on the upper side of the electric motor 22, even if foreign objects such as wear debris are generated from the coupling portions of the female spline portion 27B of the electric motor shaft 27 and the male spline portion 41A of the hydraulic motor shaft 41, these foreign objects do not enter upwardly toward the pistons 36, the shoes 37, the swash plate 38, the cylinder block, and the like inside the hydraulic motor casing 35. As a result, the hydraulic motor 34 can be operated properly over extended periods of time, thereby making it possible to enhance the reliability of the swing device 11 as a whole.

Furthermore, as the hydraulic motor 34 is disposed on the upper side of the electric motor 22, the drain oil which is generated during the operation of the hydraulic motor 34 can be allowed to flow down into the drain oil chamber 35C defined between the hydraulic motor lower flange portion 35B of the hydraulic motor casing 35 and the lid portion 23B of the electric motor casing 23, and this drain oil can be automatically supplied to the coupling portions of the female spline portion 27B of the electric motor shaft 27 and the male spline portion 41A of the hydraulic motor shaft 41, as described above.

Accordingly, as compared with a configuration in which, for example, the electric motor is disposed on the upper side of the hydraulic motor, it is unnecessary to adopt a measure for forcibly supplying lubricating oil to the coupling portions of the female spline portion 27B of the electric motor shaft 27 and the male spline portion 41A of the hydraulic motor shaft 41, so that the configuration of the swing device 11 as a whole can be simplified.

Next, the swing device 11 in accordance with this embodiment is arranged such that the shaft insertion hole 23E through which the upper end side of the electric motor shaft 27 is inserted is provided in the lid portion 23B of the electric motor casing 23, the bearing 28 is provided between this shaft insertion hole 23E and the electric motor shaft 27, and the pressure tight seal 43 is provided by being located upwardly of that bearing 28.

For this reason, the coupling portions of the female spline portion 27B provided on the upper end side of the electric motor shaft 27 and the male spline portion 41A provided on the lower end side of the hydraulic motor shaft 41 can be firmly supported by the bearing 28 arranged on the outer peripheral side thereof, so that the electric motor shaft 27 and the hydraulic motor shaft 41 which are coaxially coupled can be rotated smoothly.

As the pressure tight seal 43 is provided upwardly of the bearing 28, the coupling portions of the female spline portion 27B of the electric motor shaft 27 and the male spline portion 41A of the hydraulic motor shaft 41 can be constantly lubricated properly by making use of the drain oil which leaked from the hydraulic motor 34. Moreover, as the gap between the shaft insertion hole 23E of the electric motor casing 23 and the electric motor shaft 27 is sealed by the pressure tight seal 43, it is possible to reliably prevent the ingress of the drain oil into the electric motor casing 23.

As a result, since it is possible to enhance the durability of the coupling portions of the electric motor shaft 27 and the hydraulic motor shaft 41, and the service life of the electric motor 22 can be prolonged, it is possible to enhance the reliability of the swing device 11 as a whole.

Next, as the female spline portion 27B constituted by a bottomed hole is provided in the upper end portion of the electric motor shaft 27, it is possible to form the recessed hole 27C on the bottom side of the female spline portion 27B. In consequence, even if foreign objects such as wear debris are generated from the coupling portions of the female spline portion 27B of the electric motor shaft 27 and the male spline portion 41A of the hydraulic motor shaft 41, these foreign objects such as wear debris can be captured within the recessed hole 27C. For this reason, it is possible to prevent the foreign objects such as wear debris from entering between the lip portion 43B of the pressure tight seal 43 and the outer peripheral surface of the electric motor shaft 27, making it possible to prolong the service life of the pressure tight seal 43. As a result, the sealability between the shaft insertion hole 23E of the electric motor casing 23 and the electric motor shaft 27 can be kept satisfactorily over extended periods of time, thereby making it possible to prolong the service life of the swing device 11.

Meanwhile, with the swing device 11, the reduction gear lower flange portion 14A of the reduction gear 12 is fixed to the revolving frame 3A by means of the bolts 16. In this case, as shown in FIG. 5, each bolt 16 is inserted through the bolt insertion hole 14A1 of the reduction gear lower flange portion 14A and the bolt hole 3A1 of the revolving frame 3A, and the socket portion 48A of the fastening tool 48 is engaged with the head of this bolt 16.

As such, with regard to the swing device 11 in accordance with this embodiment, the outside diameter dimension A of the reduction gear lower flange portion 14A for attaching the bolts 16 is set to be largest. On this premise, the outside diameter dimension B of the reduction gear upper flange portion 15B and the electric motor lower flange portion 23C of the electric motor 22 is set to a dimension which makes it possible to secure the appropriate clearance S1 between, on the one hand, the outer peripheral surfaces of the reduction gear upper flange portion 15B and the electric motor lower flange portion 23C and, on the other hand, the extended shank portion 48B of the fastening tool 48. Similarly, the outside diameter dimension C of the electric motor upper flange portion 23D of the electric motor 22 and the hydraulic motor lower flange portion 35B of the hydraulic motor 34 is set to a dimension which makes it possible to secure the appropriate clearance S2 between, on the one hand, the outer peripheral surfaces of the electric motor upper flange portion 23D and the hydraulic motor lower flange portion 35B and, on the other hand, the extended shank portion 48B of the fastening tool 48.

In consequence, when the bolt 16 is attached or removed by means of the fastening tool 48 from above the hydraulic motor 34 during the operation of mounting or dismounting the reduction gear 12 with respect to the revolving frame 3A, the fastening tool 48 can be reliably prevented from interfering with such as the reduction gear upper flange portion 15B, the electric motor lower flange portion 23C, the electric motor upper flange portion 23D, and the hydraulic motor lower flange portion 35B. Hence, it is possible to enhance the operational efficiency at the time of mounting or dismounting the reduction gear 12.

Moreover, the power supply box 29 mounted on the electric motor 22 is arranged at a position spaced apart by the distance D in the circumferential direction from the extended shank portion 48B of the fastening tool 48, the temperature detector 30 is arranged at a position spaced apart by the distance E in the circumferential direction from the extended shank portion 48B of the fastening tool 48, and the rotational speed detector 31 is arranged at a position spaced apart by the distance F in the circumferential direction from the extended shank portion 48B of the fastening tool 48. As a result, since the fastening tool 48 can be reliably prevented from interfering with such as the power supply box 29, the temperature detector 30, and the rotational speed detector 31 which are mounted on the electric motor 22, it is possible to protect the power supply box 29, the temperature detector 30, the rotational speed detector 31, and the like. At the same time, it is possible to enhance the operational efficiency at the time of mounting or dismounting the reduction gear 12 by using the fastening tool 48.

It should be noted that, in the above-described embodiment, the case is illustrated in which the reduction gear casing 13 of the reduction gear 12 is constituted by the lower casing 14 and the upper casing 15. However, the present invention is not limited to the same, and it is possible to adopt a configuration in which, for example, a reduction gear casing constituted by a single casing is used.

In addition, in the above-described embodiment, a description has been given by citing as an example the swing device 11 which is applied to the hydraulic excavator 1. However, the present invention is not limited to the same, and the swing device may be widely applied to other construction machines equipped with the swing device, such as a hydraulic crane.

DESCRIPTION OF REFERENCE NUMERALS

1: Hydraulic excavator (Construction machine)
2: Lower traveling structure
3: Upper revolving structure
5: Revolving ring
11: Swing device
12: Reduction gear
13: Reduction gear casing
14A: Reduction gear lower flange portion
15B: Reduction gear upper flange portion
16: Bolt
22: Electric motor
23: Electric motor casing
23B: Lid portion
23C: Electric motor lower flange portion
23D: Electric motor upper flange portion
23E: Shaft insertion hole
27: Electric motor shaft
27B: Female spline portion
28: Bearing
29: Power supply box
30: Temperature detector (Detector)
31: Rotational speed detector (Detector)
34: Hydraulic motor
35: Hydraulic motor casing
35B: Hydraulic motor lower flange portion
41: Hydraulic motor shaft
41A: Male spline portion
43: Pressure tight seal (Seal member)
44: Output shaft
48: Fastening tool

The invention claimed is:
1. A swing device for a construction machine comprising:
a reduction gear which is mounted in a vertically extending manner on an upper revolving structure mounted on a lower traveling structure by means of a revolving ring;
an electric motor mounted on an upper side of said reduction gear and having an electric motor shaft which rotates upon supply of electric power thereto;
a hydraulic motor mounted on an upper side of said electric motor, a lower end side of a hydraulic motor shaft which rotates upon supply of operating oil thereto being coupled to an upper end side of said electric motor shaft; and
an output shaft for outputting to said revolving ring the rotation of said electric motor shaft and said hydraulic motor shaft subjected to speed reduction by said reduction gear,
wherein said electric motor has an electric motor casing lower end side of which is mounted to said reduction gear and an upper end side of which is formed by a lid portion for blocking drain oil from said hydraulic motor, a shaft insertion hole through which the upper end side of said electric motor shaft is inserted is provided in said lid portion of said electric motor casing, a bearing for rotatably supporting the upper end side of said electric motor shaft is provided between said shaft insertion hole and said electric motor shaft, the lower end side of said hydraulic motor shaft extends downwardly toward and into said shaft insertion hole, and is arranged to be coupled to the upper end side of said electric motor shaft, and a seal member for allowing the supply of the drain oil from said hydraulic motor to coupling portions of said electric motor shaft and said hydraulic motor shaft and for preventing the drain oil from entering an interior of said electric motor casing is arranged to be provided between said shaft insertion hole and said electric motor shaft and being located upwardly of said bearing.

2. The swing device for a construction machine according to claim 1, wherein a female spline portion constituted by a bottomed hole is provided in the upper end portion of said electric motor shaft, and a male spline portion which is coupled to said female spline portion is provided on the lower end portion of said hydraulic motor shaft, the drain oil from said hydraulic motor being arranged to lubricate the coupling portions of said female spline portion of said electric motor shaft and said male spline portion of said hydraulic motor shaft.

3. The swing device for a construction machine according to claim 2, wherein said reduction gear has a reduction gear lower flange portion provided on a lower end side thereof and fastened to said upper revolving structure by means of bolts and has a reduction gear upper flange portion provided on an upper end side thereof, said electric motor has an electric motor lower flange portion provided on a lower end side thereof and fixed to said reduction gear upper flange portion and has an electric motor upper flange portion provided on an upper end side thereof, a hydraulic motor lower flange portion which is fixed to said electric motor upper flange portion is provided on the lower end side of said hydraulic motor, and outside diameter dimensions of said reduction gear upper flange portion, said electric motor lower flange portion, said electric motor upper flange portion, and said hydraulic motor lower flange portion are small as compared to an outside diameter dimension of said reduction gear lower flange portion to which said bolts are attached, and are set to dimensions which make it possible to secure a clearance with a fastening tool which is used when said reduction gear lower flange portion is fastened to said upper revolving structure by means of said bolts.

4. The swing device for a construction machine according to claim 1, wherein said reduction gear has a reduction gear lower flange portion provided on a lower end side thereof and fastened to said upper revolving structure by means of bolts and has a reduction gear upper flange portion provided on an upper end side thereof, said electric motor has an electric motor lower flange portion provided on a lower end side thereof and fixed to said reduction gear upper flange portion and has an electric motor upper flange portion provided on an upper end side thereof, a hydraulic motor lower flange portion-which is fixed to said electric motor upper flange portion is provided on the lower end side of said hydraulic motor, and outside diameter dimensions of said reduction gear upper flange portion, said electric motor lower flange portion, said electric motor upper flange portion, said hydraulic motor lower flange portion are small as compared to an outside diameter dimension of said reduction gear lower flange portion to which said bolts are attached, and are set to dimensions which make it possible to secure a clearance with a fastening tool which is used when said reduction gear lower flange portion is fastened to said upper revolving structure by means of said bolts.

5. The swing device for a construction machine according to claim 4, wherein a power supply box for supplying electric power to said electric motor and various detectors including a temperature detector for detecting the temperature of said electric motor are arranged to be mounted on said electric motor, and said power supply box and said detectors are respectively arranged at positions spaced apart in a circumferential direction from a position of said fastening tool which is used when said reduction gear lower flange portion is fastened to said upper revolving structure by means of said bolts.

* * * * *